(No Model.)

S. Y. TABB.
CIGAR TIP CUTTER.

No. 599,878. Patented Mar. 1, 1898.

WITNESSES:

INVENTOR
Samuel Y. Tabb
BY
Witter & Kenyon
ATTORNEYS.

UNITED STATES PATENT OFFICE.

SAMUEL Y. TABB, OF BROOKLYN, NEW YORK.

CIGAR-TIP CUTTER.

SPECIFICATION forming part of Letters Patent No. 599,878, dated March 1, 1898.

Application filed February 10, 1896. Serial No. 578,696. (No model.)

*To all whom it may concern:*

Be it known that I, SAMUEL Y. TABB, a citizen of the United States, and a resident of Brooklyn, in the county of Kings and State of New York, have invented a new and useful Improvement in Cigar-Tip Cutters, of which the following is a specification.

This invention relates to cigar-tip cutters, and has for its object to provide a cigar-tip cutter of simple, compact, and economical construction and adapted to be carried suspended from the watch-chain of the wearer.

Figure 1:
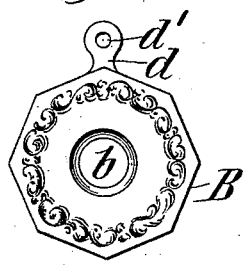
Figure 2:
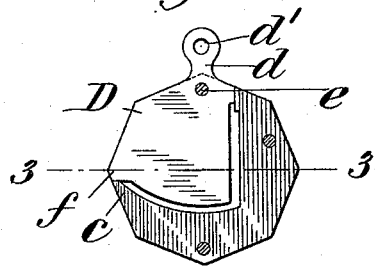
Figure 3:
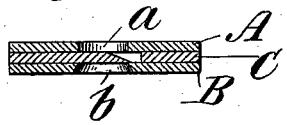
Figure 4:
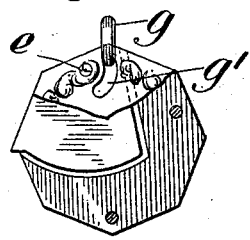
Figure 5:
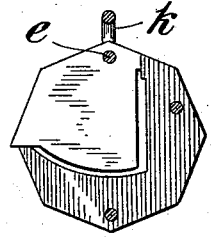

In the drawings forming part of this specification, and in which like letters designate similar parts, Figure 1 is a plan view of a cutter embodying my invention with the knife housed. Fig. 2 is a plan view of the cutter with one side of the casing removed. Fig. 3 is a sectional view on the line 3 3 of Fig. 2. Figs. 4 and 5 show modifications.

The casing as shown in the drawings consists of two flat plates A and B, provided with apertures $a$ and $b$. Between the plates A and B is a spacing-plate C, cut away on one side to form between the plates A and B a slot or space for the knife D. The three plates are suitably secured together, as by screws or rivets, with the apertures $a$ and $b$ opposite each other to receive the tip of the cigar. The knife is pivoted to the casing at $e$ and is provided with a stem $d$, having an eye $d'$, from which the cutter may be suspended and which serves as a handle to withdraw the knife from the casing. The pivot $e$ is so disposed with respect to the center of gravity of the cutter that when the cutter hangs free from its point of suspension the knife falls by gravity and enters the casing, so as to be fully housed therein. The knife is provided with a stop, such as the stop $f$, to limit its movement into the casing, so as to prevent its edge from striking the plate C or other part of the casing, and the knife is so arranged that it cannot be withdrawn from the casing far enough to expose its edge. This may be effected by arranging the stem $d$ to strike against the upper end of the plate C or by arranging the lower inner point of the knife to strike against the plate C at $c$, or in any other suitable way. The result of this arrangement of the knife is that its edge at all times remains housed within the casing and fully protected from harm.

In Fig. 4 is shown a modification embodying the invention in which the stem $d$ of the knife is omitted. In this case a suspension-ring $g$ passes through the knife on one side of the pivot $e$, and the casing is provided with a slot $g'$, through which the ring works when the knife is worked in and out of the casing. By this arrangement the knife is also caused to return into the casing automatically.

In Fig. 5 a suspension-ring $k$ is attached to the pivot $e$, and the knife of its own weight returns into the casing when the cutter is freely suspended.

While I prefer to make the cutter in substantially the form shown in Figs. 1, 2, and 3, since this form best embodies all the features of my complete invention, yet some of the advantages of the invention may be secured in the forms shown in Figs. 4 and 5. Moreover, I do not wish to be limited to the particular form or construction of the casing shown in the drawings. I might employ any form or construction of casing so long as it had an opening for the exit and entrance of the knife, the knife returning automatically to its place in the casing, so as to be effectually housed thereby when the cutter is freely suspended.

It will be seen that in accordance with this invention a simple, efficient, and economical cutter is provided, in which the knife-edge is freely protected from injury at all times and is prevented from cutting the clothing or person of the wearer, and which may be worn suspended from the watch-chain of the wearer in the form of an ornamental charm whose appearance in no way discloses its purpose.

What I claim as new, and desire to secure by Letters Patent, is—

A cigar-tip cutter comprising a thin casing having an aperture through its side to receive a cigar-tip and a slot on one edge, the casing being otherwise entirely closed; said casing consisting of outer plates A and B and inner angle-plate C, all fastened securely together, and a knife D pivoted in the slot in the casing so as to sweep over the said aperture, the plate C providing stops at its ends to so limit the movement of the knife that its edge remains permanently housed and protected in the casing, the knife permanently closing the slot in which it works, substantially as set forth.

In testimony whereof I have signed my name to this specification in the presence of two subscribing witnesses.

SAMUEL Y. TABB.

Witnesses:
NICHOLAS M. GOODLETT, Jr.,
EDWIN SEGER.